United States Patent [19]

Robbins, Jr.

[11] Patent Number: 4,572,320

[45] Date of Patent: Feb. 25, 1986

[54] AUTOMATIC DOOR LOCK PREVENTION SYSTEM

[76] Inventor: Robert W. Robbins, Jr., 3341 Laurel Grove S., Jacksonville, Fla. 32217

[21] Appl. No.: 612,453

[22] Filed: May 21, 1984

[51] Int. Cl.[4] .............................................. B60R 18/00

[52] U.S. Cl. ...................................... 180/289; 70/237; 70/263; 340/52 D

[58] Field of Search ....................... 180/271, 287, 289; 70/237, 262, 263; 340/52 D

[56] References Cited

U.S. PATENT DOCUMENTS 3,399,554 9/1968 Hogue .................................. 70/262
4,223,296 9/1980 Kim et al. ......................... 340/52 D
4,240,516 12/1980 Henderson et al. ................ 180/289

*Primary Examiner*—Joseph F. Peters, Jr.
*Assistant Examiner*—Kenneth R. Rice
*Attorney, Agent, or Firm*—Arthur G. Yeager

[57] ABSTRACT

A system to prevent an automobile door from being locked while the key is in the ignition switch and the driver is outside comprising an electric circuit including a switch on the ignition lock that is closed when the key is in the lock, a switch on the door that is closed when the door is open and a switch on the door lock mechanism that is closed when the lock mechanism is moved toward the locked position; the closing of all three switches activating a solenoid which moves the lock mechanism to the unlocked position.

12 Claims, 8 Drawing Figures

AUTOMATIC DOOR LOCK PREVENTION SYSTEM

BACKGROUND OF THE INVENTION

It is a widespread fear shared by many automobile owners that they will lock themselves out of their automobile inadvertently. This was accomplished easily in earlier models when a driver was able to lock his car by pressing down on the locking button or rod on the window frame and closing the door. A key left in the ignition was easily forgotten in the hurry to get out of the car and lock it. Soon thereafter, the automobiles were manufactured with warning buzzers to remind the driver when he opened his door that his key was in the ignition lock. In another system the locking mechanism is reversed from locked to unlocked if the ignition key is in the lock and the driver opens the door. Examples of such prior art systems are found in U.S. Pat. No. 3,399,554 to Hogue and U.S. Pat. No. 4,223,296 to Kim et al. While these systems are meritorious they do not provide the ultimate in fail-safe systems nor do they provide the best in energy saving systems.

It is an object of this invention to provide an improved system for prevention of unintentional door locking. It is another object of this invention to provide such a system which is efficient in energy usage. Still other objects will appear from the more detailed description which follows.

BRIEF DESCRIPTION OF THE INVENTION

This invention relates to a system for an automobile to prevent the driver from locking the doors when the ignition key is in the ignition lock and the driver is outside the automobile comprising:

a. a source of electric current;

b. a first switch means associated with the ignition lock and adapted to be closed when said key is in said lock, said first switch being connected to said source of electric current;

c. a second switch associated with one or both of the front doors of said automobile and adapted to be closed when said door is open, said second switch being connected in series with said first switch;

d. a third switch means associated with a solenoid operated means adapted to unlock said door when said third switch means is closed; said third switch adapted to be closed by the driver activating the means for locking said door from inside the automobile; and e. relay means connected in series between said first switch means and said third switch means.

In a specific embodiment of this invention the first switch means includes a primary switch which is closed when the ignition key is inserted into the ignition lock and a secondary switch which is closed when the ignition key is turned on; and the relay means includes a separate relay connected in series with the primary and secondary switches respectively.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

In the prior art of U.S. Pat. No. 3,399,554 to Hogue there is shown a system for preventing a driver from locking himself out of his automobile while the key is in the ignition lock. An electric circuit is provided with a switch connected to the ignition lock and a switch connected to the door. When the ignition key is in the lock and the door is open both switches are closed completing the circuit which energizes a solenoid that raises the door locking rod and keeps the door in an unlocked position. This system involves an unnecessary and undesirable drain on the battery which provides the electrical current for the system. In the present invention a solenoid that unlocks the door is energized only when the driver attempts to lock the door by pushing down on the locking rod or by pushing a button in an electrical lock system.

Figure 1:
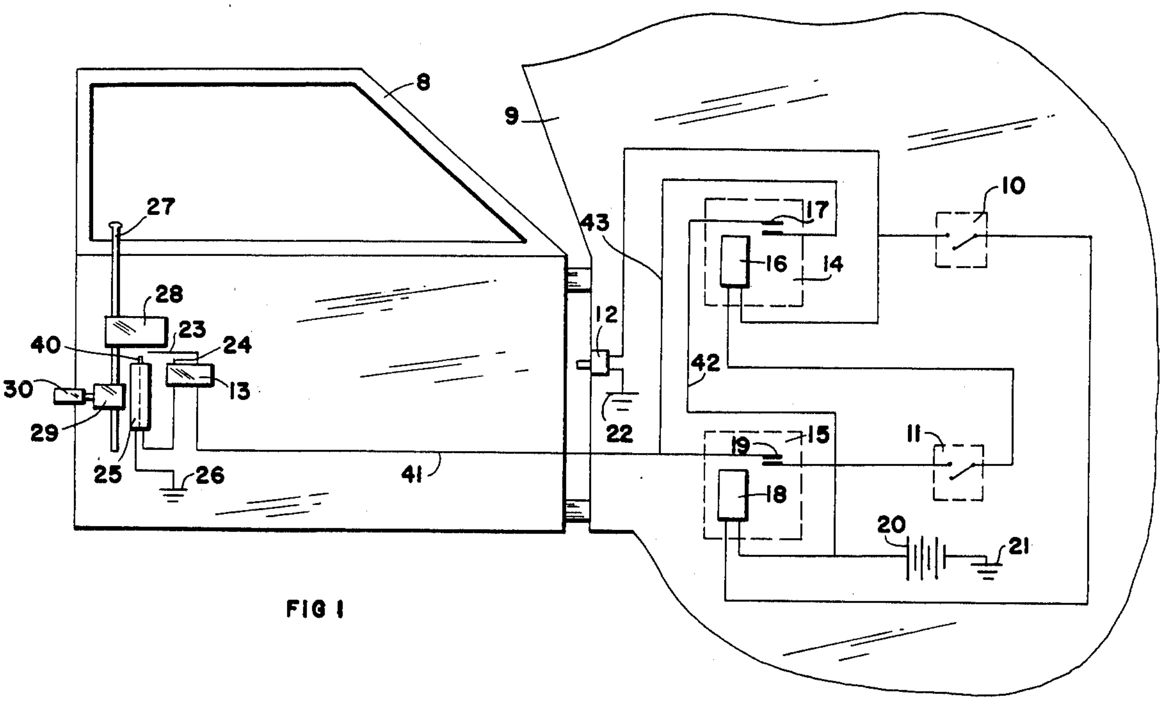
FIG. 1 is a schematic layout of the system of this invention installed in an automobile.

The elements of the present invention are best seen in FIG. 1. An automobile frame 9 has a front door 8 hinged thereto with a door locking rod 27 projecting upwardly from the window frame of door 8. In order to lock door 8 rod 27 is pushed down and in order to unlock door 8 rod 27 is pulled up, the total movement of rod 27 being ¼ to ½ inch from the up position to the down position. In the case of an electric lock system rod 27 is substituted by a toggle switch on door 8 having a lock position and an unlock position activated by finger pressure on either of the two ends of a button connected to the switch.

Inside the automobile is an engine ignition lock which is locked or unlocked by a key carried by the driver. The ignition lock is employed in starting the engine of the automobile by insertion of the ignition key into the ignition lock and twisting the key to energize the starter. Switches 10 and 11 are connected to the ignition lock in this invention. Primary switch 10 is open when the ignition key is not in the ignition lock and is closed when the key is inserted into the lock. Secondary switch 11 is open except when the ignition key has been twisted to the engine operation position, i.e., for energizing the starter and for continuing to supply electric power for the operation of the engine.

Also inside the automobile frame 9 is a door switch 12 to sense whether door 8 is open or closed. Such a switch normally has a spring biased finger projecting outwardly from the switch body that is contacted by the door frame when the door is closed, pushing the finger inwardly against the outward bias of the spring. For purposes of this invention switch 12 is closed when door 8 is open.

A door locking switch 13 is also included in the electric circuit which includes switches 10, 11, and 12 described above. Switch 13 is open at all times except when the driver attempts to lock door 8. In the embodiment shown there is a door locking rod 27 which is pushed downwardly to lock door 8, and when that occurs switch 13 is closed to complete the entire circiut of this invention. When the circuit is completed solenoid 25 is energized which pushes locking rod 27 upwardly to unlock door 8. Thus, it can be appreciated that this invention causes door 8 to be unlocked when three events occur:

(a) the ignition key is in the ignition lock regardless of whether the engine is or is not operating;

(b) door 8 is open; and (c) an attempt is made to lock door 8.

Figure 2:
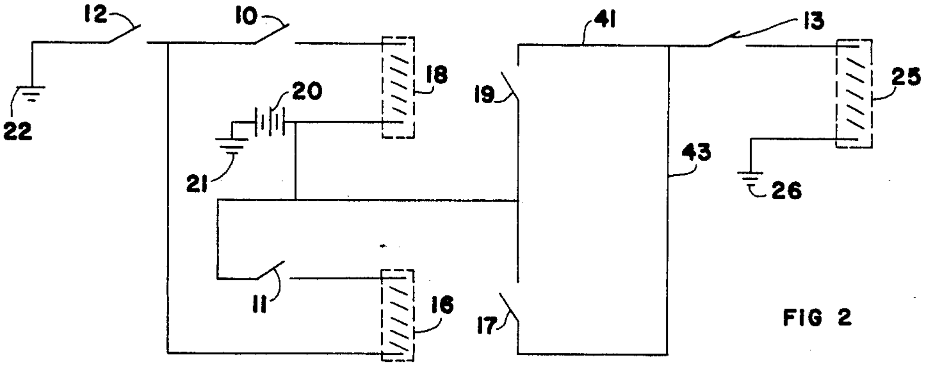
FIG. 2 is a circuit diagram of the system of this invention.
Figure 3:
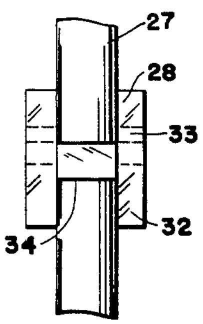
FIG. 3 is a front elevational view of the door lock rod with contact arm attached thereto.
Figure 4:
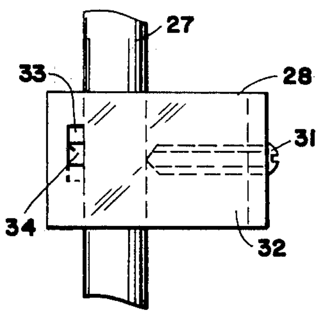
FIG. 4 is a side elevational view of the combination of FIG. 3.
Figure 5:
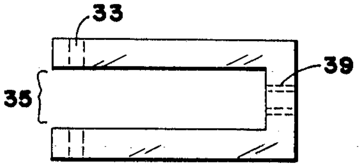
FIG. 5 is a top plan view of the contact arm channel member of FIG. 3.
Figure 6:
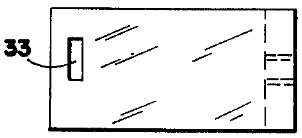
FIG. 6 is a side elevational view of the channel member of FIG. 5.
Figure 7:
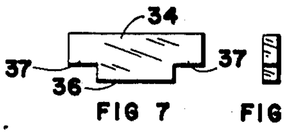
FIG. 7 is a front elevational view of the back support member of the contact arm of FIGS. 3 and 4.
Figure 8:
FIG. 8 is a side elevational view of the back support member of FIG. 7.

The complete electric circuit is shown in FIG. 2 while the circuit associated with mechanical equipment of the automobile is shown in FIG. 1. Power for the circuit comes from battery 20 having one of its terminals grounded at 21. Switch 12 which senses the opening of door 8 has one side grounded at 22. If the key is in the ignition lock primary switch 10 will be closed and with door 8 open switch 12 will be closed. A circuit is completed from ground 21 through battery 20, coil 18 (which closes contacts 19), switch 10, switch 12 to ground 22. This circuit is ready to be extended to microswitch 13 through line 41 as soon as contact is made between flexible contact 23 and rigid contact 24 which occurs as soon as the driver attempts to push locking rod 27 downward. Lateral arm 28 pushes contact 23 against contact 24 completing the circuit through solenoid 25 to ground 26. The energizing of solenoid 25 causes plunger 40 to move upward against arm 28 causing rod 27 to move upward unlocking the door 8. Actually the locking and unlocking of door 8 is accomplished by rod 27 causing mechanism 29 to move locking bolt 30 into or out of a recess in frame 9 to lock or unlock door 8, respectively. Mechanism 29 may take on any of a variety of well known power transmission forms, such as cams, levers, gears, etc. Locking bolt 30 may be replaced by the more popular rotary lock employed today in automobiles requiring mechanism 29 to transform vertical movement of rod 27 into rotary movement of lock 30. These well known power transmission means for use in mechanism 29 and lock 30 are not a part of the invention and, accordingly, are not described in detail here. Furthermore, this invention is equally applicable to electrically locked doors in which a button on the inside of door 8 is pushed one way or the other to lock or unlock, respectively, door 8. Solenoid 25 is operated to cause the button to return to the unlocked position.

If ignition key is in the ignition lock with the engine operating, secondary switch 11 is closed making a circuit from ground 21 through battery 20 to switch 11 through coil 16 (which closes contacts 17) to switch 12 and to ground 22. This circuit is ready to be extended through line 42, relay contacts 17 to line 43 to line 41 and to microswitch 13 for completion to ground 26 as soon as contacts 23 and 24 are closed on each other. This will produce the same effect as described above in pushing rod 27 to the unlock position or in moving the button of an electrical locking system to the unlock position.

In FIGS. 3–8 there are shown the elements of a means for attaching a lateral arm 28 to door locking rod 27 so as to cause the closing of microswitch 13 and to be pushed upwards by the plunger of solenoid 25. Lateral arm 28 comprises channel member 32, back support member 34, and set screw 31. Channel member 32 is made with a channel width 35 slightly larger than the diameter of rod 27 so that rod 27 may have a sliding fit within channel width 35. Channel member is fashioned with slot 33 in each of its legs to admit back support member 34 to be passed therethrough. Support member 34 has a wide body portion 36 having a width substantially that of channel width 35 and a height 38 substantially the height of slots 33. On each side of support member 34 there is a flange 37. Support member 34 may be passed partially through slots 33 and allowed to drop into place with flanges 37 resting in slots 33 and body portion 36 extending across width 35. Set screw 31 may then be inserted into tapped hold 39 and tightened to press support member 34 against rod 27 to hold lateral arm 28 in any fixed position. It is, of course, desirable that arm 28 be adjusted such that a very small movement (1/32 to ⅛ inch) of rod 27 will cause contacts 23 and 24 to close, activating solenoid 25 to unlock door 8. Solenoid 25 has a plunger 40 which moves upward upon activation. Plunger may be bolted or welded to channel member 32 or merely press against a surface of member 32 so as to move it upwards to unlock door 8.

It should be apparent from the foregoing description that this invention provides a material saving in energy in that solenoid 25 is not energized except when the driver attempts to lock door 8 and as soon as the solenoid causes the door to be unlocked, the solenoid is no longer energized.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A system for an automobile to prevent the driver from locking the doors when the ignition key is in the ignition lock and the driver is outside the automobile comprising:

a. a source of electric current;

b. a first switch means associated with the ignition lock and adapted to be closed when said key is in said lock, said first switch being connected to said source of electric current;

c. a second switch associated with the front door on the driver's side of said automobile and adapted to be closed when said door is open, said second switch being connected in series with said first switch;

d. means for locking said door from inside the automobile;

e. a third switch means associated with a solenoid operated means adapted to unlock said door when said third switch means is closed; said third switch adapted to be closed by the driver activating said means for locking said door from inside the automobile; and f. relay means connected in series between said first switch means and said third switch means.

2. The system of claim 1 wherein said first switch means includes a primary switch adapted to be closed when said key is inserted fully into said ignition lock and a secondary switch adapted to be closed when said key is turned to the position for starting the engine of said automobile.

3. The system of claim 2 wherein said relay means includes a primary relay connected in series with said primary switch and a secondary relay connected in series with said secondary switch.

4. The system of claim 1 wherein said means for locking said door includes a manually operated push-pull longitudinally slidable rod to lock-unlock respective said door, said rod including a shoulder means adapted to close said third switch means when said rod is pushed toward the lock position.

5. The system of claim 4 wherein said rod is moved to the unlock position by said solenoid operated means activated by the closing of said third switch.

6. The system of claim 1 wherein said means for locking said door includes a manually operable means to cause said door to be locked or unlocked, said manually operable means when activated to lock said door also closes said third switch means.

7. The system of claim 6 wherein said solenoid operated means, upon being activated by closing said third switch, reverses said manually operable means to the unlock position.

8. A system for preventing an automobile driver from locking himself out of the automobile while the ignition key is in the ignition lock which comprises an electric power source connected to an ignition switch means in said ignition lock which is closed when said key is fully inserted into said lock, door switch means which is closed when the driver's door is open and which is connected in series with said ignition switch means, a door lock switch means connected in series with said ignition switch means and said door switch means to make a circuit with said power source when said door lock switch means is closed, said door lock switch means being adapted to be closed when said driver operates the door locking means to lock the door, and a solenoid operated door unlocking means which is activated upon closing of said door lock switch means.

9. The system of claim 8 wherein said ignition switch means includes a first ignition switch adapted to be closed by the insertion of said key into said lock and a second ignition switch adapted to be closed when said key is turned to start the engine of the automobile.

10. The system of claim 9 wherein a first relay is connected in series with said first ignition switch and said door lock switch means and a second relay is connected in series with said second ignition switch and said door lock switch means.

11. The system of claim 8 wherein said door locking means comprises a reciprocal sliding rod on the inside of said door operated manually to lock and unlock said door.

12. The system of claim 8 wherein said door locking means comprises a manually operable means to lock or unlock said door.

* * * * *